United States Patent
Lanter

(10) Patent No.: US 8,464,658 B2
(45) Date of Patent: Jun. 18, 2013

(54) CONTAINER SYSTEM

(76) Inventor: Andrew Lanter, Teaneck, NJ (US)

( * ) Notice: Subject to any disclaimer, the term of this patent is extended or adjusted under 35 U.S.C. 154(b) by 0 days.

(21) Appl. No.: 13/409,895

(22) Filed: Mar. 1, 2012

(65) Prior Publication Data
US 2012/0222624 A1    Sep. 6, 2012

Related U.S. Application Data

(60) Provisional application No. 61/447,779, filed on Mar. 1, 2011.

(51) Int. Cl.
*A01K 5/01*    (2006.01)
*F25D 3/08*    (2006.01)

(52) U.S. Cl.
USPC ............... 119/61.52; 62/457.6; 62/457.9

(58) Field of Classification Search
USPC .............. 119/61.52, 61.5; 62/440, 457.1, 62/457.2, 457.3, 457.4, 457.6, 457.9
See application file for complete search history.

(56) References Cited

U.S. PATENT DOCUMENTS

| | | | |
|---|---|---|---|
| 2,412,718 A | 12/1946 | Seigh | |
| 3,698,594 A * | 10/1972 | Boehlert | 220/495.01 |
| 4,691,664 A * | 9/1987 | Crowell | 119/61.52 |
| 4,798,173 A * | 1/1989 | Wilgren | 119/61.52 |
| 5,005,524 A * | 4/1991 | Berry | 119/51.11 |
| 5,138,980 A * | 8/1992 | Ewing | 119/73 |
| 5,231,953 A * | 8/1993 | Garrett | 119/61.52 |
| 5,271,244 A | 12/1993 | Staggs | |
| 5,345,784 A * | 9/1994 | Bazemore et al. | 62/371 |
| 5,560,316 A | 10/1996 | Lillelund et al. | |
| 6,145,474 A * | 11/2000 | Lemkin | 119/61.5 |
| 6,230,653 B1 | 5/2001 | Tobin | |
| 6,379,582 B1 | 4/2002 | Putman | |
| 6,632,845 B1 * | 10/2003 | Gassiraro | 514/772.5 |
| 6,647,741 B2 * | 11/2003 | Pechous et al. | 62/457.6 |
| 7,204,202 B2 * | 4/2007 | Behun et al. | 119/61.5 |
| 7,913,648 B2 * | 3/2011 | Maeda | 119/61.52 |
| 8,065,888 B2 * | 11/2011 | Rogers | 62/457.6 |
| 2003/0079492 A1 * | 5/2003 | Pechous et al. | 62/457.6 |
| 2005/0056226 A1 * | 3/2005 | Ruggiero, Jr. | 119/61.52 |
| 2006/0278168 A1 * | 12/2006 | Behun et al. | 119/61.5 |
| 2007/0180850 A1 * | 8/2007 | Thompson | 62/457.2 |
| 2007/0256449 A1 * | 11/2007 | Torre | 62/457.6 |
| 2010/0058797 A1 * | 3/2010 | Rogers | 62/457.6 |
| 2010/0180827 A1 * | 7/2010 | Becattini et al. | 119/61.54 |
| 2010/0313815 A1 | 12/2010 | Maeda | |
| 2011/0283946 A1 * | 11/2011 | Fairbanks | 119/61.5 |

FOREIGN PATENT DOCUMENTS

EP    1505089    2/2005

OTHER PUBLICATIONS

European Search Report dated Jul. 9, 2012.

* cited by examiner

*Primary Examiner* — Yvonne Abbott
(74) *Attorney, Agent, or Firm* — Ostrolenk Faber LLP

(57) ABSTRACT

A container in accordance with an embodiment of the present disclosure includes a base with a core removably mounted in the base. The core includes a temperature controlling substance used to cool the contents of the container over a prolonged period of time. The core is removable from the base for placement in a freezer or other cold environment and then replaced to provide cooling to the material in the container.

7 Claims, 4 Drawing Sheets

CONTAINER SYSTEM

CROSS REFERENCE TO RELATED APPLICATIONS

The present application claims benefit of and priority to U.S. Provisional Patent Application Ser. No. 61/447,779, filed Mar. 1, 2011 and entitled RECEPTACLE SYSTEM, the entire content of which is hereby incorporated by reference herein.

BACKGROUND

1. Field of the Disclosure

The present disclosure relates to a container and more specifically to a container usable by a pet and configured to provide cooling for a substance in the container.

2. Related Art

There are a variety of bowls and other containers that are used for feeding and watering pets such as cats and dogs. One consideration when considering the best container for providing food or water to a pet includes environmental conditions, particularly extreme heat. Pet food and water tend to remain standing for relatively long periods of time during the day. When temperatures are high, the food and/or water may heat up making it unappetizing and perhaps unhealthy for the pet.

Some pet owners may simply add ice to their pet's water to keep it cool. This practice, however, does not keep the water cool for a long period of time. Further, the ice may be an impediment to the pet as it drinks and may present a choking hazard.

Accordingly it would be desirable to provide a container for feeding and/or watering a pet that avoids these and other problems.

SUMMARY

It is an object of the present disclosure to provide a container that allows for cooling of food or water for a house pet.

A container in accordance with an embodiment of the present disclosure includes a base and a core element removably mounted on the base. The core element preferably includes a lower bowl shaped shell, a smaller, upper bowl shaped shell connected to the lower bowl shaped shell, such that a cavity is formed between the lower bowl shaped shell and the upper bowl shaped shell and a temperature controlling material provided in the cavity and configured to remain cool for a period of time and to cool material placed in the upper bowl shaped shell of the core element.

Other features and advantages of the present invention will become apparent from the following description of the invention which refers to the accompanying drawings.

DETAILED DESCRIPTION OF THE EMBODIMENTS

Figure 1:
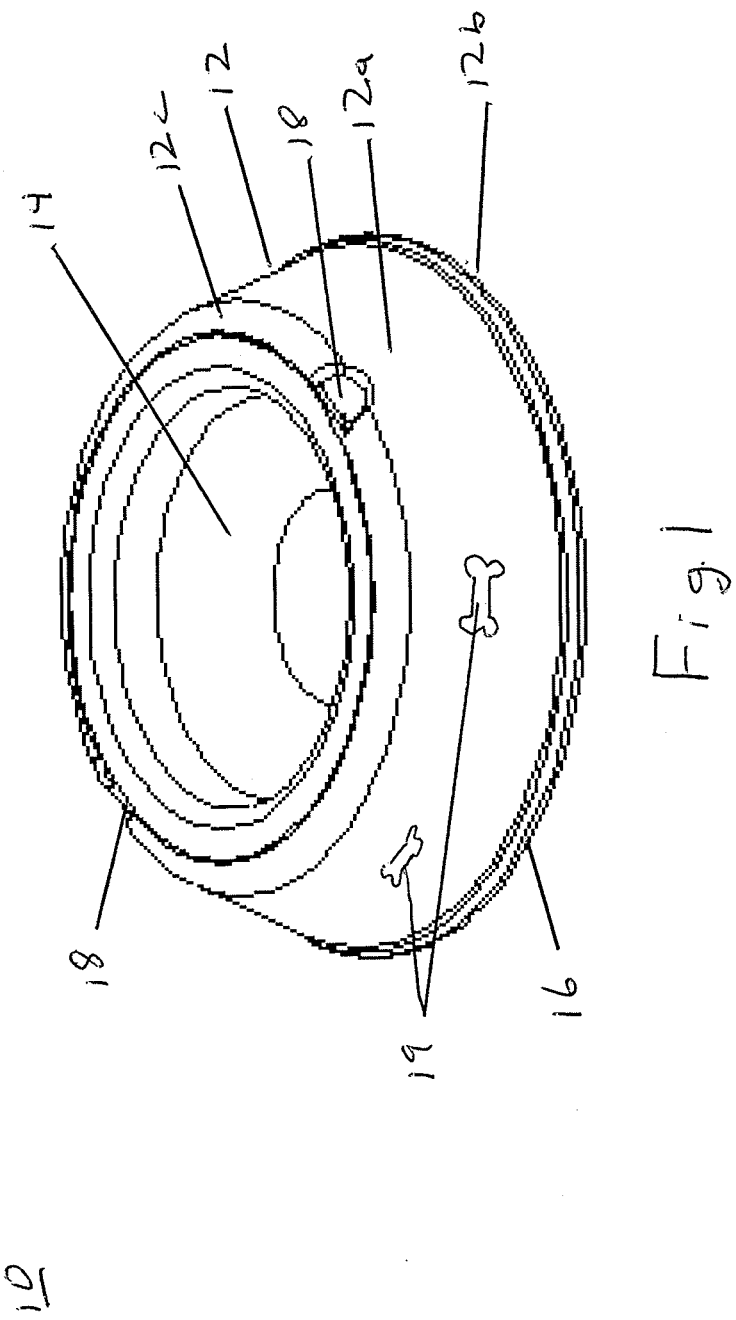
FIG. 1 is a perspective view of an exemplary embodiment of a container system in accordance with an embodiment of the present disclosure.
Figure 2:
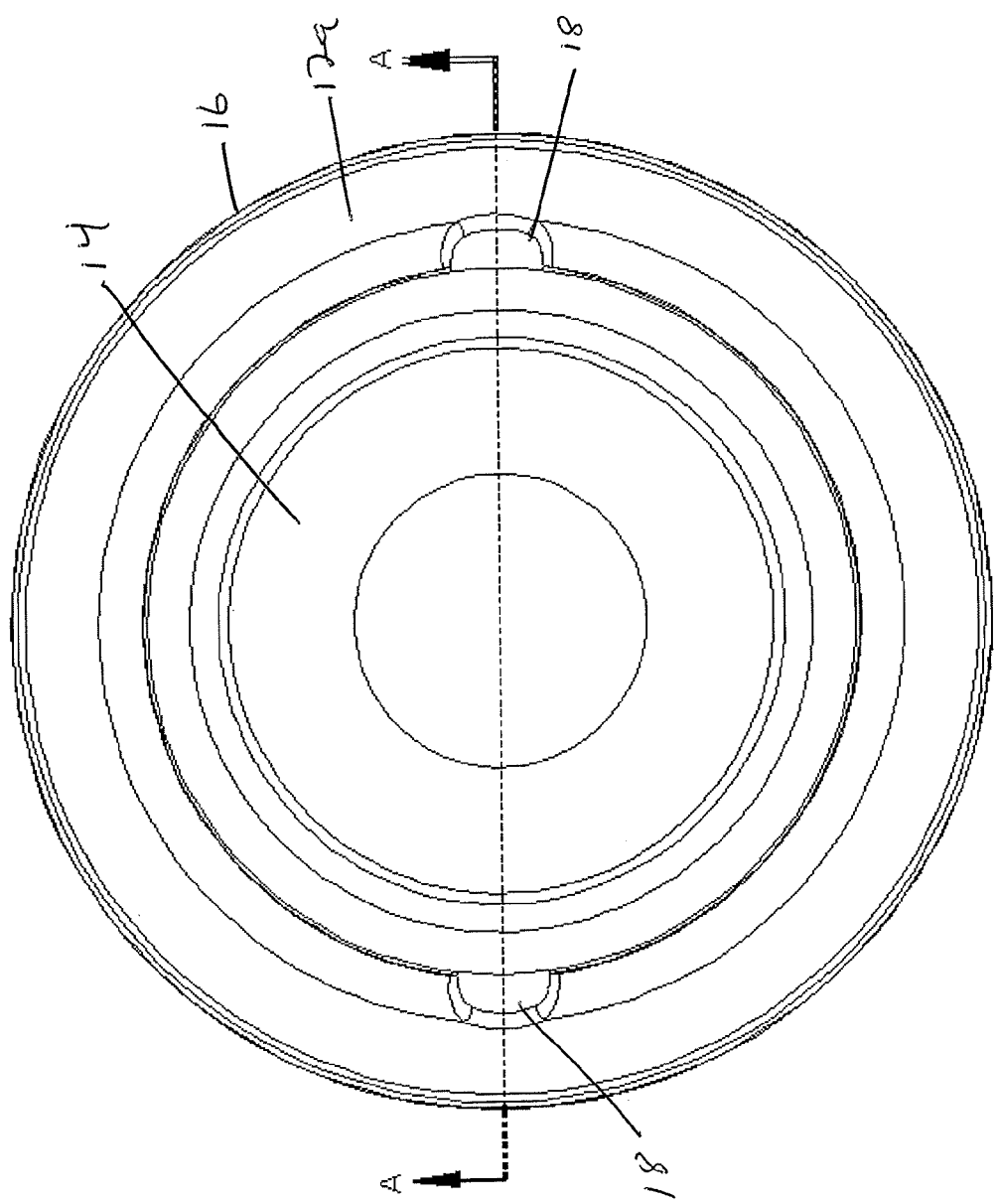
FIG. 2 is a top view of the container system of FIG. 1.

FIG. 1 illustrates an exemplary embodiment of a container, or container system, 10 in accordance with an embodiment of the present disclosure. The container 10 preferably includes a container body 12 having an ergonomic and aesthetic configuration that is designed to receive and support a core element 14 configured to hold food or water for a house pet such as a cat or dog. The core element 14 is configured to provide selective cooling to the food or water that is provided therein over a period of at least several hours. The core element 14 is preferably removably mounted in the body 12.

The body 12 is preferably annular in shape and includes a continuous formed shell having a generally frusto-conical shape. In an embodiment, the body 12 includes a continuous wall 12a that angularly projects upward from a bottom 12b that is preferably covered by a nonskid ring 16. The ring 16 helps prevent the container 10 from sliding along the floor as it is used.

An inward extending upper flange 12c is provided at the top of the wall 12a. The core 14 is preferably supported on an inner edge of the upper flange 12c. The upper flange 12c also includes opposed depressions 18 that are configured to allow a user to easily lift the core 14 from the upper flange 12c. Most simply, the core 14 is removed when a user inserts his or her fingers into the depressions 18 and lifts the core 14 upward and out of the body 12.

The wall 12a may also include decorative elements 19 along an outer surface thereof. In a preferred embodiment, the decorative elements 19 are provided as one or more recesses in the wall 12a. The recesses 19 illustrated in FIG. 1, for example, are shaped like dog bones, however, any desired shape may be used. In addition, the recesses 19 may also be helpful to aid users in lifting the container 10, without having to contact either the food inside or the bottom of the container, which may be dirty. That is, the recesses 19 may be used as finger holds for a user to easily lift the container 10.

The core 14 preferably includes an upper shell 14a and a lower shell 14b. The upper shell 14a smaller than the lower shell 14b and is mounted in the lower shell 14b. Both the upper shell 14a and the lower shell 14b have a bowl shape. In a preferred embodiment, food or water is placed in the upper shell 14a. A top edge 20 of the lower shell 14b is preferably bonded to a top edge 22 of the upper shell 14a circumferentially. These edges may be bonded in any desirable manner, including, but not limited to ultrasonic welding.

Figure 3:
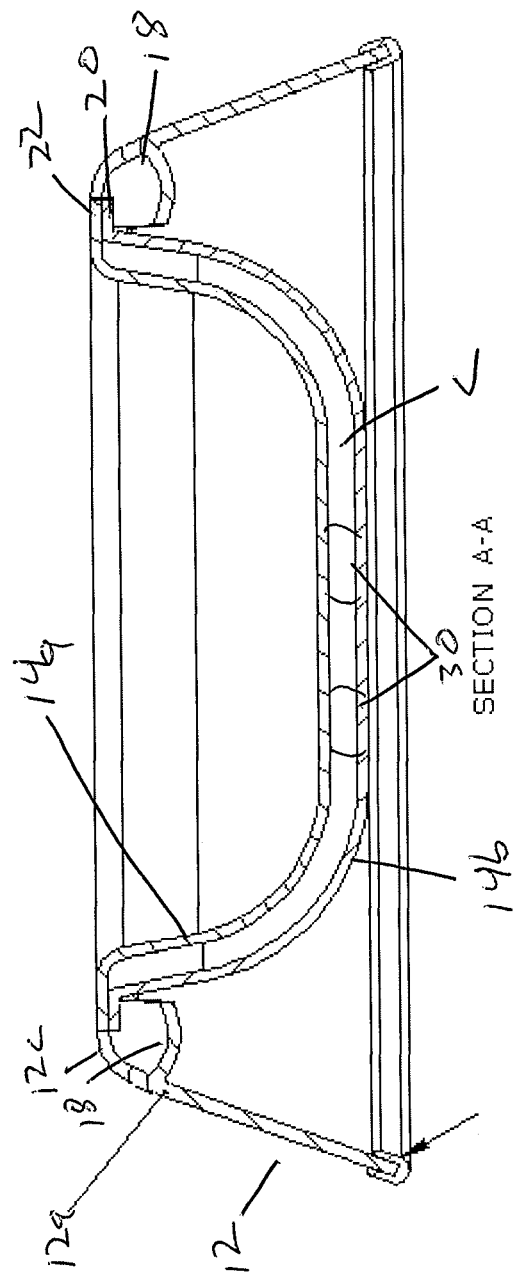
FIG. 3 is a cross-sectional view of the container system of FIGS. 1 and 2.
Figure 4:
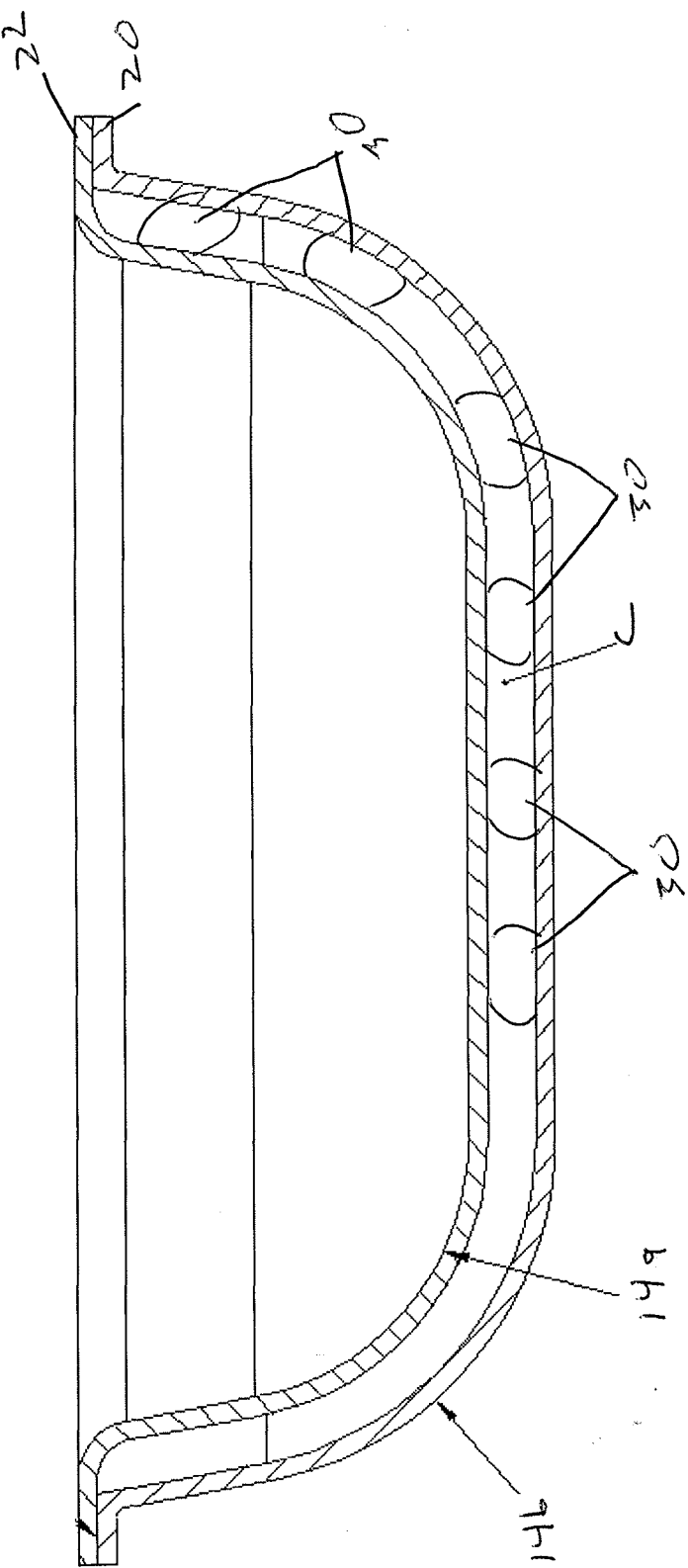
FIG. 4 is a more detailed view of a core element of the container system of FIGS. 1-3.

In a preferred embodiment, at least the upper shell 14a is made of a substantially translucent material. The upper shell 14a is smaller than the lower shell 14b such that a cavity C is formed between the upper shell 14a and the lower shell 14b as can be seen in the cross-sectional views of FIGS. 3-4, for example. The cavity C is preferably configured to accommodate a temperature controlling material 30 (See FIGS. 3-4) that may be used to cool the food or water provided in the core 14 over a relatively long period of time, preferably at least several hours. In a preferred embodiment, the temperature controlling material 30 is hydrated Cationic Polyacrylamide (CPAM).

The CPAM material typically is provided as dry grains of material. These grains are then soaked in water and absorb water over time. That is, the grains are hydrated or saturated. In a preferred embodiment, a grain size of the CPAM material is selected to correspond to the width of the cavity C. More specifically, the grain size of the CPAM material is selected such that the grain size of the CPAM, when hydrated, or saturated, is the substantially same as that of the cavity C. In a preferred embodiment, a plurality of grains of hydrated CPAM 30 is positioned in the cavity C between the lower shell 14b and upper shell 14a. The saturated grains have a substantially spherical shape, and when positioned in the cavity C, they self form into a honeycomb type pattern. In a preferred embodiment, color is added to the grains, or at least to selected grains of the hydrated CPAM to enhance their aesthetic impact. If desired, the grains may be colored and arranged in the cavity C to provide a decorative design. In a preferred embodiment, the width of the cavity C is preferably approximately ¼ of an inch.

The core 12 is removable from the body 14 and may be placed in a freezer, or other cold environment, to provide cooling. The CPAM material 30 cools and remains cold for several hours even after removal from the freezer. In this manner, the core 14 remains cold for hours even if left out in a hot environment, which, in turn keeps food or water in the core 14 cool as well. In a preferred embodiment, the core 14 cools its contents such that they remain at or below room temperature for eight to ten hours.

In a preferred embodiment, the cavity C has a width of ¼ inch, as noted above, and the grains of CPAM material are selected to have substantially the same width when hydrated, or saturated. This combination of parameters has been found to provide the best results with respect to usefulness, aesthetic appeal and performance. If larger grains and a corresponding larger cavity C are used, the weight of the core 14, and the container 10 as a whole become too heavy. Further, the space available in the upper shell 14a to hold food or water would be smaller, and thus, would allow for carrying less food or water. Further, larger grains of CPAM tend to result in freezing of materials placed in the core 14, which is undesirable. Meanwhile, a smaller cavity size results in decreased cooling. Further, a smaller cavity makes it more difficult to place the grains in the cavity properly, and thus, is disfavored.

The thickness of the plastic used in the upper and lower shells 14a, 14b, respectively, is preferably about 0.1 inch. Thinner plastic tends to crack with repeated cooling and thawing. Thicker plastic reduces heat transfer from the material 30 to the substance in the core 14, and thus, does not provide sufficient cooling. Does not provide sufficient cooling.

In an embodiment, the upper shell 14a may include indicia used to designate certain volumes of fluid therein. That is, the indicia allow the user to determine how much water I sin the upper shell 14a.

Although the present invention has been described in relation to particular embodiments thereof, many other variations and modifications and other uses will become apparent to those skilled in the art.

What is claimed is:

1. A container system comprising:
    a base; and
    a core element removably mounted on the base;
    the core element further comprising:
        a lower bowl shaped shell;
        a smaller, upper bowl shaped shell connected to the lower bowl shaped shell, such that a cavity is formed between the lower bowl shaped shell and the upper bowl shaped shell; and
        a temperature controllin material provided in the cavity and configured to remain cool for a period of time and to cool material placed in the upper bowl shaped shell of the core element, the base further comprises:
    an annular bottom;
    a sidewall extending upward and inward from the bottom;
    a top flange extending inward at a top of the sidewall, the top flange configured to support the removable core on an inner portion thereof.

2. The container of claim 1, wherein the top flange further comprises a pair of recesses formed therein and positioned on opposite sides of the core element, the recesses configured to accommodate a user finger and to allow contact with the upper flange of the core element.

3. The container of claim 2, wherein the sidewall includes at least one recess formed therein to provide a finger hold for a user to lift the container.

4. A container system comprising:
    a base; and
    a core element removably mounted on the base;
    the core element further comprising:
        a lower bowl shaped shell;
        a smaller, upper bowl shaped shell connected to the lower bowl shaped shell, such that a cavity is formed between the lower bowl shaped shell and the upper bowl shaped shell; and
        a temperature controlling material provided in the cavity and configured to remain cool for a period of time and to cool material placed in the upper bowl shaped shell of the core element, the temperature controlling material is hydrated Cationic Polyacrylamide and grains of the hydrated Cationic Polyacrylamide are selected for positioning in the cavity such that they have a width that is substantially the same as that of the cavity.

5. The container of claim 4, wherein the cavity has a width of substantially ¼ inch.

6. The container of claim 5, wherein the grains of hydrated Cationic Polyacrylamide are positioned in the shell in a honey-comb like pattern.

7. The container of claim 5, wherein selected grains of hydrated Cationic Polyacrylamide are colored and positioned in the cavity to form a desired pattern.

* * * * *